US012794254B2

(12) United States Patent
Tang et al.

(10) Patent No.: US 12,794,254 B2
(45) Date of Patent: Nov. 10, 2026

(54) BATTERY CONTROL METHOD, DEVICE THEREOF, AND BATTERY

(71) Applicant: Lenovo (Beijing) Limited, Beijing (CN)

(72) Inventors: Zhuoqun Tang, Beijing (CN); Hui Kong, Beijing (CN); Jialong Sun, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 809 days.

(21) Appl. No.: 18/310,860

(22) Filed: May 2, 2023

(65) Prior Publication Data

US 2023/0396085 A1 Dec. 7, 2023

(30) Foreign Application Priority Data

Jun. 6, 2022 (CN) ........................ 202210628429.X

(51) Int. Cl.

*H01M 10/44* (2006.01)
*H01M 10/46* (2006.01)
*H01M 10/48* (2006.01)
*H02J 7/00* (2006.01)
*H02J 7/82* (2026.01)

(52) U.S. Cl.

CPC ............. *H02J 7/825* (2026.01); *H01M 10/44* (2013.01); *H01M 10/46* (2013.01); *H01M 10/488* (2013.01); *H02J 7/865* (2026.01)

(58) Field of Classification Search

CPC .......... H02J 7/825; H02J 7/865; H01M 10/46; H01M 10/488; H01M 10/48; H01M 10/425; H01M 50/569

USPC ................. 320/107, 112, 114, 115, 132, 149

See application file for complete search history.

(56) References Cited

U.S. PATENT DOCUMENTS

| | | | | |
|---|---|---|---|---|
| 11,932,128 | B2 * | 3/2024 | Inoue | B60L 53/305 |
| 2018/0006475 | A1 * | 1/2018 | Huang | H02J 7/663 |

FOREIGN PATENT DOCUMENTS

| | | | | | |
|---|---|---|---|---|---|
| CN | 102263304 | A | * | 11/2011 | |
| CN | 108574317 | A | * | 9/2018 | H02J 7/875 |
| CN | 208385552 | U | * | 1/2019 | |
| CN | 112615071 | B | * | 5/2022 | H02J 7/94 |
| DE | 112019002929 | T5 | * | 4/2021 | H02J 7/751 |
| JP | 2022011801 | A | * | 1/2022 | H02J 7/84 |
| KR | 20230029531 | A | * | 3/2023 | H01M 50/54 |
| WO | WO-2015045015 | A1 | * | 4/2015 | H02J 7/865 |
| WO | WO-2019160232 | A1 | * | 8/2019 | H01M 10/4257 |

OTHER PUBLICATIONS

Machine translation CN102263304A (Nov. 30, 2011) (Year: 2011).*
Machine translate CN108574317A (Sep. 25, 2018) (Year: 2018).*
Machine translation JP(2022011801 (Jan. 17, 2022) (Year: 2022).*

* cited by examiner

*Primary Examiner* — Edward Tso

(74) *Attorney, Agent, or Firm* — ANOVA LAW GROUP, PLLC

(57) ABSTRACT

A battery control method applied to a first battery includes obtaining measurement information of a first negative pole tab and a second negative pole tab, determining a first parameter of a negative electrode plate based on the measurement information, determining a charging parameter and/or a discharging parameter of the first battery based on the first parameter, and controlling charging or discharging of the first battery based on the charging parameter and/or the discharging parameter.

17 Claims, 4 Drawing Sheets

BATTERY CONTROL METHOD, DEVICE THEREOF, AND BATTERY

CROSS-REFERENCE TO RELATED APPLICATION

This application claims priority to Chinese Patent Application No. 202210628429.X, filed on Jun. 6, 2022, the entire content of which is incorporated herein by reference.

TECHNICAL FIELD

The present disclosure relates to the battery control technology field and, more particularly, to a battery control method, a battery control device, and a battery.

BACKGROUND

In the battery field, when a proportion of a silicon material added into a silicon-based cathode is higher, energy density of the silicon-based cathode is higher. However, silicon is easy to pulverize in circulation, which restricts the development of the silicon-based cathode and causes ion channel blockage and battery internal resistance to increase rapidly. Thus, as the silicon material increases in the silicon-based cathode, problems of low first efficiency, high expansion, and cycle attenuation of the battery can occur. The problems can cause safety issues such as thermal effect and crystallization. Thus, a reasonable battery charge and discharge control strategy are particularly important.

SUMMARY

Embodiments of the present disclosure provide a battery control method applied to a first battery. The method includes obtaining measurement information of a first negative pole tab and a second negative pole tab, determining a first parameter of a negative electrode plate based on the measurement information, determining a charging parameter and/or a discharging parameter of the first battery based on the first parameter, and controlling charging or discharging of the first battery based on the charging parameter and/or the discharging parameter.

Embodiments of the present disclosure provide a battery control device applied to a first battery, including one or more processors and one or more memories. The one or more memories store a computer program that, when executed by the one or more processors, causes the one or more processors to obtain measurement information of a first negative pole tab and a second negative pole tab, determine a first parameter of a negative electrode plate based on the measurement information, determine a charging parameter and/or a discharging parameter of the first battery based on the first parameter, and control charging or discharging of the first battery based on the charging parameter and/or the discharging parameter.

Embodiments of the present disclosure provide a battery, including a negative electrode plate, a fuel gauge, and a controller. The negative electrode plate includes a first negative pole tab and a second negative pole tab. The fuel gauge is configured to obtain measurement information of a first negative pole tab and a second negative pole tab. The controller is configured to determine a first parameter of a negative electrode plate based on the measurement information, determine a charging parameter and/or a discharging parameter of the first battery based on the first parameter, and control charging or discharging of the first battery based on the charging parameter and/or the discharging parameter.

Embodiments of the present disclosure provide a battery control method, a battery control device, and a battery. The battery includes a first negative pole tab and a second negative pole tab. The method includes obtaining the measurement information of the first negative pole tab and the second negative pole tab, determining the first parameter of the negative electrode plate based on the measurement information, determining the charging parameter and/or the discharging parameter of the first battery based on the first parameter, and controlling the charging or discharging of the first battery based on the charging parameter and/or the discharging parameter. In the above solution, the electrical parameters of the cathode of the battery can be determined through the detection of the two negative pole tabs, the performance status of the cathode of the battery can be objectively known, and then the battery charging and discharging strategy can be adjusted in a timely manner according to the current status of the cathode of the battery. Thus, the application safety of the battery can be ensured in an extreme environment, and the service life of the battery can be increased as much as possible.

DETAILED DESCRIPTION OF THE EMBODIMENTS

The technical solutions of embodiments of the present disclosure are described in detail below with reference to the accompanying drawings of embodiments of the present disclosure. Described embodiments are only some embodiments of the present disclosure and not all embodiments. All other embodiments obtained by those skilled in the art based on embodiments in the present disclosure without creative efforts should be within the scope of the present disclosure.

Figure 1:
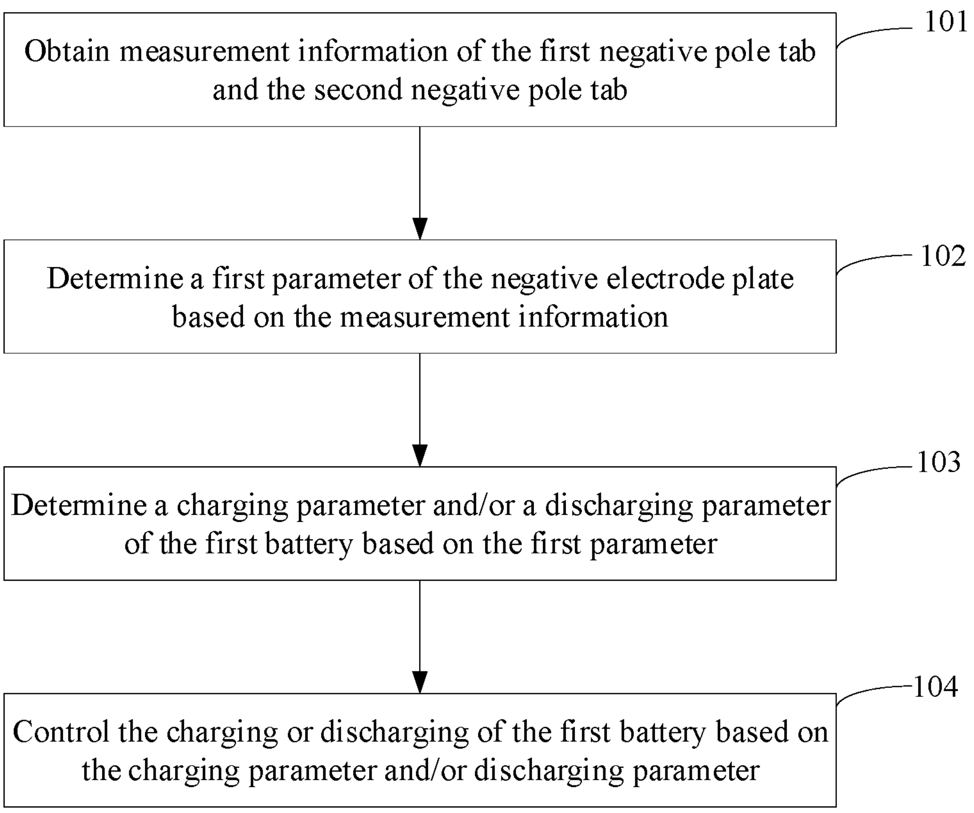
FIG. 1 illustrates a schematic flowchart of a battery control method according to some embodiments of the present disclosure.

FIG. 1 illustrates a schematic flowchart of a battery control method according to some embodiments of the present disclosure. The method shown in FIG. 1 is applied to a first battery. Negative pole pieces of the first battery include a first negative pole tab and a second negative pole tab. As shown in FIG. 1, the method includes the following processes.

At 101, measurement information of the first negative pole tab and the second negative pole tab is obtained.

Figure 2:
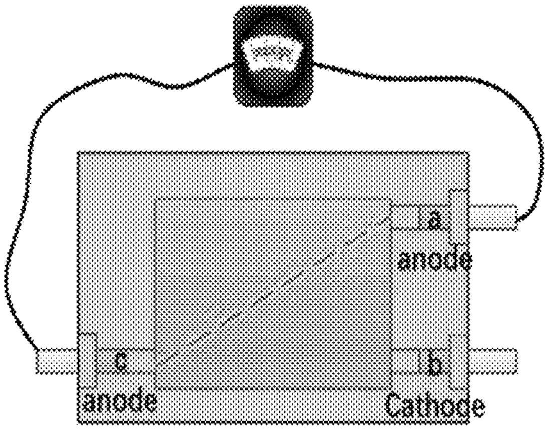
FIG. 2 illustrates a schematic diagram of detecting a pole piece status according to some embodiments of the present disclosure.

Two negative pole tabs can be arranged at a negative electrode plate of the first battery. Positions of the two negative pole tabs can be different, and electrical parameters of the two pole tabs can be detected. The electrical parameters can include but are not limited to voltage, current, etc. Measurement information of the two negative pole tabs can be used to calculate and determine information of the negative electrode plate or the first battery, which can be used as a basis for determining a battery charging and discharging strategy. FIG. 2 illustrates a schematic diagram of detecting a pole piece status according to some embodiments of the present disclosure. A cathode is a positive pole tab, and an anode is a negative pole tab. Tab a can be the first negative pole tab, and tab c can be the second negative pole tab. A structure and a detection method of dual pole tabs of the negative electrode plate can be understood in connection with FIG. 2.

When only one negative pole tab is provided, the negative pole tab may need a current during operation. When the negative pole tab is introduced to a large current, a voltage value detected at the negative pole tab can deviate, which affects accuracy of a detection result. In embodiments of the present disclosure, two negative pole tabs can be arranged at the negative electrode plate of the battery. One negative pole tab can allow a current to pass through, and the other negative pole tab cannot be provided with the current. Thus, the voltage value of the negative electrode plate can be accurately detected.

Measurement information obtained from the two negative pole tabs of the first battery can be transmitted to a fuel gauge of the battery. A corresponding control chip can perform corresponding calculation processing based on the obtained measurement information and subsequent management on the charging and discharging of the battery based on a result of the calculation processing.

At 102, a first parameter of the negative electrode plate is determined based on the measurement information.

Figure 3:
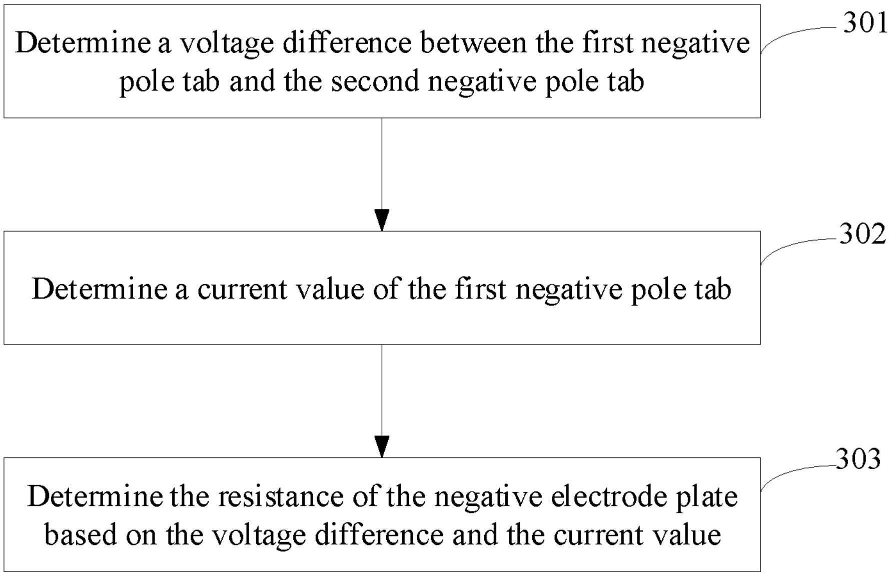
FIG. 3 illustrates a schematic flowchart of determining a first parameter according to some embodiments of the present disclosure.

The first parameter can be a resistance value of the negative electrode plate. In some embodiments, FIG. 3 illustrates a schematic flowchart of determining a first parameter according to some embodiments of the present disclosure. As shown in FIG. 3, the first parameter of the negative electrode plate is determined based on the measurement information. Determining the first parameter includes the following processes.

At 301, a voltage difference between the first negative pole tab and the second negative pole tab is determined.

At 302, a current value of the first negative pole tab is determined.

At 303, the resistance of the negative electrode plate is determined based on the voltage difference and the current value.

Based on above, one of the two negative pole tabs can allow the current to pass, and the other one cannot allow the current to pass. In some embodiments, current can flow through the first negative pole tab, and no current can flow through the second negative pole tab.

In some embodiments, the resistance value of the negative electrode plate can be determined. The resistance value of the negative electrode plate can be calculated based on formula $R=U/I$. U denotes the voltage difference between the first negative pole tab and the second negative pole tab. I denotes the current value of the first negative pole tab. To obtain a real resistance value of the negative electrode plate as accurately as possible, the positions of the two negative pole tabs should be as far as possible and at opposite sides.

Figure 4:
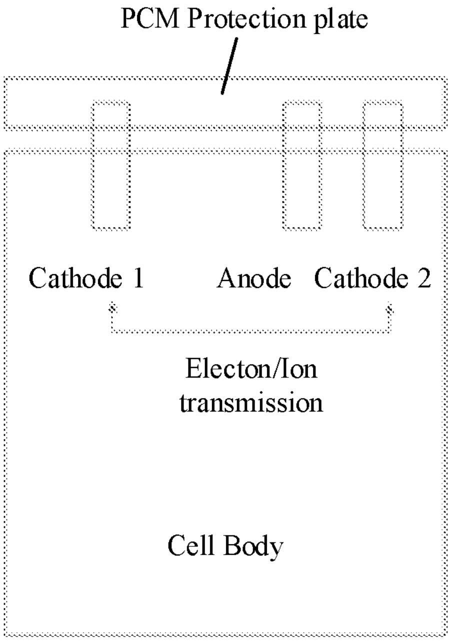
FIG. 4 illustrates a schematic structural diagram showing a working principle of a first battery according to some embodiments of the present disclosure.

In some embodiments, the battery control method can include determining the health status of the battery according to the resistance value of the negative electrode plate determined through the detection and providing an appropriate charging logic according to the battery information obtained through the detection. FIG. 4 illustrates a schematic structural diagram showing a working principle of a first battery according to some embodiments of the present disclosure. A PCM protection plate is a circuit board for protecting a circuit module. As shown in FIG. 2 and FIG. 4, the voltage difference between tab a and tab c is detected. The resistance value of the negative electrode plate is calculated in connection with the current entering the circuit. Then, the resistance value can be recorded in the fuel gauge. Current for the step charging and discharging can be designed according to different internal resistance values of the negative electrode plate to maintain a normal working status of the battery.

After process 102, the process proceeds to process 103.

At 103, a charging parameter and/or a discharging parameter of the first battery is determined based on the first parameter.

The resistance value of the negative electrode plate can reflect the health status of the negative electrode plate and also directly influence the working performance and the safety application of the battery. Thus, in some embodiments, after the resistance value of the negative electrode plate is detected through the two negative pole tabs arranged at the negative electrode plate of the battery, whether the current battery charging and discharging strategy and standard are appropriate and have a potential safety hazard can be determined based on the resistance value of the negative electrode plate.

When the resistance value of the negative electrode plate is increased, the battery can be aged. The battery charging and discharging strategy should be adjusted timely to avoid situations of heat effect, crystallization, battery capacity decrease. In the present disclosure, the negative electrode plate with the dual pole tab structure can be provided. By detecting the two negative pole tabs in real-time, the change of the negative electrode plate can be quickly responded to, and a charging and discharging solution can be adjusted in real-time. In some embodiments, after the resistance value of the negative electrode plate is determined, the charging parameter and/or the discharging parameter of the battery can be calculated based on the predetermined algorithm.

At 104, the charging or discharging of the first battery is controlled based on the charging parameter and/or discharging parameter.

After the charging parameter and/or the discharging parameter suitable for the current resistance value of the negative electrode plate is determined, a charging process and a discharging process of the first battery can be correspondingly controlled directly based on the determined parameters.

In the battery control method, the electrical parameter of the cathode of the battery can be detected through the two negative pole tabs arranged at the negative electrode plate of the battery to objectively know the performance status of the cathode of the battery. Then, the charging and discharge strategy of the battery can be timely adjusted according to the current status of the cathode of the battery. Thus, the battery can be ensured to be used safely in an extreme environment, and the service life of the battery can be prolonged as far as possible.

Based on the above, determining the charging parameter and/or the discharging parameter of the first battery based on the first parameter can include that, when the resistance value of the negative electrode plate is in a first interval, a charging voltage of the first battery is a first charging voltage, and a discharging voltage of the first battery is a first discharging voltage, and when the resistance value of the negative electrode plate is in a second interval, the charging voltage of the first battery is a second charging voltage, and the discharging voltage of the first battery is a second discharging voltage.

A value in the first interval can be smaller than a value in the second interval. The first charging voltage can be larger than the second charging voltage. The first discharging voltage can be smaller than the second discharging voltage.

When the resistance value of the negative electrode plate is increased, the battery can be aged. Thus, a mild charging and discharging strategy can be selected. That is, a corresponding charging cut-off voltage, a charging current, and a discharging current can be reduced, and a discharging cut-off voltage can be increased. Table 1 and Table 2 show an exemplary charging strategy and an exemplary discharging strategy of a three-pole tab battery, respectively, which is step charging and discharging strategies. That is, when the resistance value of the negative electrode plate is in different intervals, different charging and discharging cutoff voltages and different charging and discharging currents can be used.

TABLE 1

Charging strategy of three-pole tab battery

| Determination condition | Voltage and power limit and UI display |
|---|---|
| 0 < R < X mΩ | In an initial state of the system, max. charging voltage ($V_{max}$), charging current ($I_{charge}$), and Capacitance fully charged ($C_{full}$) |
| X mΩ ≤ R < X + 10 mΩ | $V = V_{max} - AmV$<br>UI display: $C = B*C_{full}$ and ≤100%<br>A is an adjustment voltage, and B is an adjustment coefficient. |
| X + 10 mΩ ≤ R < X + 40 mΩ | $V = V_{max} - MmV$<br>$I = N*I_{charge}$<br>UI display: $C = L*C_{full}$ and ≤100%<br>M is an adjustment voltage, N is an adjustment coefficient, and L is an adjustment coefficient. |
| R ≥ X + 40 mΩ | Charging prohibited |

TABLE 2

Discharging strategy of three-pole tab battery

| Determination condition | Voltage and power limit and UI display |
|---|---|
| 0 < R < X mΩ | In an initial state of the system, min. discharging voltage ($V_{min}$), and discharging current ($I_{discharge}$) |
| X mΩ ≤ R < X + 10 mΩ | $V = V_{min} + OmV$<br>O is an adjustment voltage. |
| X + 10 mΩ ≤ R < X + 40 mΩ | $V = V_{min} + PmV$<br>$I = QI_{discharge}$<br>P is an adjustment voltage, and Q is an adjustment coefficient. |
| R ≥ X + 40 mΩ | Discharging prohibited |

In addition, Table 1 and Table 2 also show a modification solution of the electrical parameters in a user interaction (UI) display interface of the electronic device. In some embodiments, the electrical parameters displayed in the UI display interface can be correspondingly adjusted with the adjustments of the charging and discharging cutoff voltages. A corresponding modification coefficient can be multiplied to display power at 100% when the battery is fully charged no matter in which interval the resistance value of the negative electrode plate is. The power can be displayed at 0% when the battery is fully discharged. Thus, no jump can occur.

Based on this, after the charging parameter and/or the discharging parameter of the first battery are determined based on the first parameter, the method can further include adjusting power output data based on the determined charging parameter or discharging parameter. The power output data can be used to display an output in the user interface. In some embodiments, the power output data can be adjusted based on the product of the determined charging parameter or discharging parameter and the corresponding modification coefficient. Thus, the power output data can be 100% when the first battery is fully charged and 0% when the first battery is fully discharged.

For example, in a charging scenario, when the resistance value of the negative electrode plate is in an interval of XmΩ≤R≤X+10 mΩ, the charging voltage can be V=Vmax−50 mV, and the power displayed in the UI interface can be C=1.08*Cfull. When the resistance value of the negative electrode plate is in an interval of X+10 mΩ≤R≤X+40 mΩ, the charging voltage can be V=Vmax−200 mV, the charging current can be I=0.8*Icharge, and the power displayed in the UI interface can be C=1.28*Cfull.

For example, in a discharging scenario, when the resistance value of the negative electrode plate is in an interval of XmΩ≤R≤X+10 mΩ, the discharging voltage can be V=Vmin+50 mV. When the resistance value of the negative electrode plate is in an interval of X+10 mΩ≤R≤X+40 mΩ, the discharging voltage can be V=Vmin+200 mV, and the discharging current can be I=0.8*Idischange.

The above descriptions in Table 1 and Table 2 and the related text are only examples and do not limit the charging and discharging strategies of the present disclosure. In practical application, interval division of the resistance value of the negative electrode plate and the charging and discharging parameters of the intervals can be appropriately set in connection with the battery characteristics and the control precision requirements.

Figure 5:
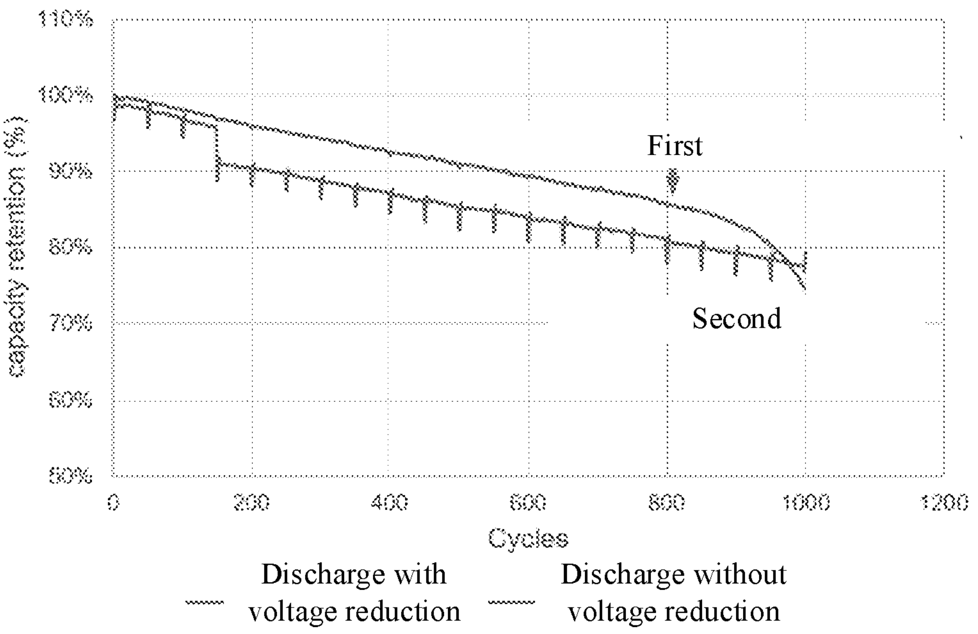
FIG. 5 illustrates a schematic diagram showing a battery circulation performance curve before and after using a step charging and discharging strategy according to some embodiments of the present disclosure.

The above-step charging and discharging strategy for the battery can be a long-term protection strategy for the battery. An implementation effect of the step charging and discharging strategy is shown in FIG. 5. FIG. 5 illustrates a schematic diagram showing a battery circulation performance curve before and after using a step charging and discharging strategy according to some embodiments of the present disclosure. Curve 1 denotes a battery cycle performance curve without using the step charging and discharging strategy. Curve 2 denotes a battery cycle performance curve using the step charging and discharging strategy. As shown in FIG. 5, when the battery is conventionally controlled for charging and discharging, the capacity of the battery rapidly decreases after an 800-th cycle (corresponding to curve 1). After the step charging and discharging strategy is applied to the battery, the capacity of the battery always remains in a relatively stable status (corresponding to curve 2).

As shown in Table 1 and Table 2, when the resistance value of the negative electrode plate is greater than a first value (corresponding to an interval of R≥X+40 mΩ in the table), the first battery is controlled to stop charging and/or discharging. When the resistance value of the negative electrode plate reaches a certain value, if the battery is continuously charged and discharged, a battery safety-related accident can likely happen. Thus, the battery can be directly controlled to prohibit charging and discharging under the condition.

In the application of the silicon-based cathode, since a volume of the silicon-based cathode can change greatly in a charging and discharging cycle process of the battery, a situation that the capacity suddenly and rapidly decreases can easily occur, which suddenly causes the battery to fail. This situation cannot be detected in a conventional battery only including one positive pole tab and one negative pole tab. However, in the three-pole tab structure including one positive pole tab and two negative pole tabs of the present disclosure, when the resistance value of the negative electrode plate suddenly increases, the change of the negative electrode plate can be timely responded to through a corresponding detection and processing. Thus, the charging and discharging solution can be timely adjusted to even prohibit charging and discharging to avoid the safety accident of the battery. Prohibiting the charging and discharging of the battery can be a short-term protection strategy for the battery.

Based on the above embodiments, the battery control method can further include determining the battery voltage value of the first battery based on the measurement information of the positive pole tab and the second negative pole tab of the first battery and controlling the first battery to charge based on the battery voltage value.

Since the current does not flow through the second negative pole tab, a potential difference between the positive pole tab and the second negative pole tab can be detected, which can reflect a real cell voltage of the battery. When a pole tab is connected to a large current, the battery may be polarized. Voltages of pole tab a and pole tab b can be falsely high. Thus, the battery can enter a constant voltage stage too early, and the whole charging time can be increased.

Figure 6:
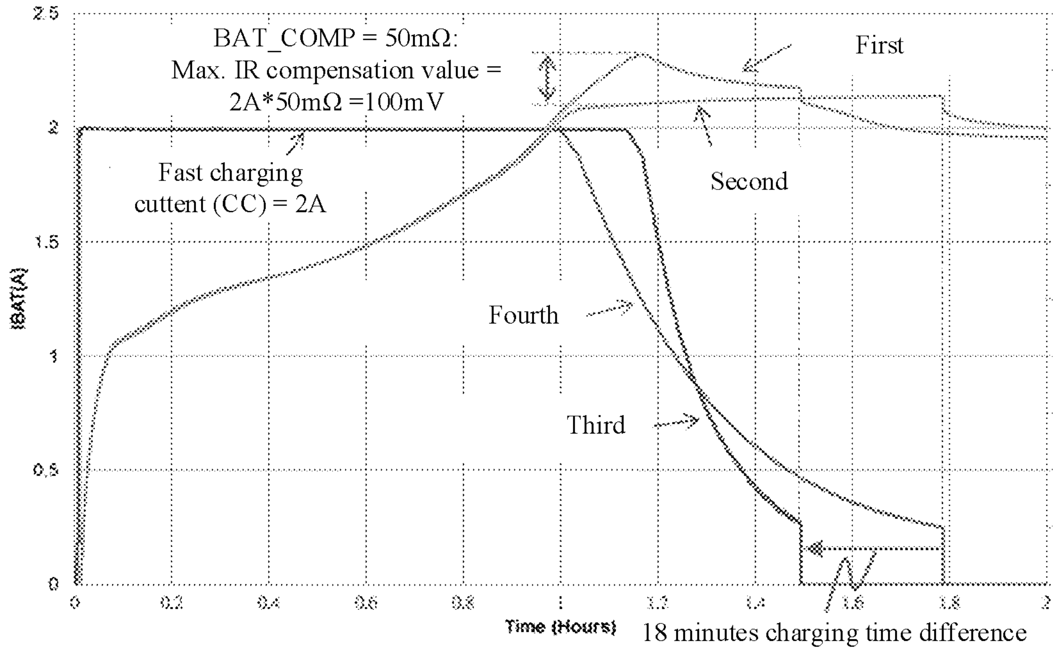
FIG. 6 illustrates a schematic diagram showing a parameter curve before and after performing power correction based on a three-pole tab according to some embodiments of the present disclosure.

FIG. 6 illustrates a schematic diagram showing a parameter curve before and after performing power correction based on a three-pole tab according to some embodiments of the present disclosure. Curve 1 represents a voltage curve after voltage compensation is performed based on the three-pole tab. Curve 2 represents a voltage curve before the voltage compensation is performed based on the three-pole tab. Curve 3 represents a current curve after voltage compensation is performed based on the three-pole tab. Curve 4 represents the current curve before the voltage compensation is performed based on the three-pole tab.

Referring to FIG. 6, the fuel gauge of the battery performs the voltage compensation by estimating a correction coefficient, which is not flexible and accurate enough. The present disclosure provides the second negative pole tab, with which the cell voltage value can be accurately detected in real-time, and the charging time can be reduced.

Those skilled in the art should know that constant current charging can be performed first in the battery charging process. The battery can be charged to a fixed voltage value with a constant current, and the battery can be then charged with a constant voltage. In the constant voltage charging process, the charging current can decrease gradually. In the voltage compensation solution based on the three pole tab of the present disclosure, the time of the constant voltage charging can be obviously reduced compared to without the voltage compensation solution. As shown in FIG. 6, time for the current value of curve 3 to decrease to a special value is 18 minutes earlier than time for the current value of curve 4 to decrease to a special value.

In the battery control method based on the three pole tab structure of the one positive pole tab and the two negative pole tabs of embodiments of the present disclosure, the health status of the negative electrode plate of the battery can be detected in real-time, the internal resistance and the voltage of the negative electrode plate of the battery can be obtained in real-time. Thus, the battery charging and discharging strategy can be controlled based on the detection result, and the cell resistance compensation can be adjusted. Therefore, the battery can be ensured to be used as safely as possible, and the user experience can be improved.

Figure 7:
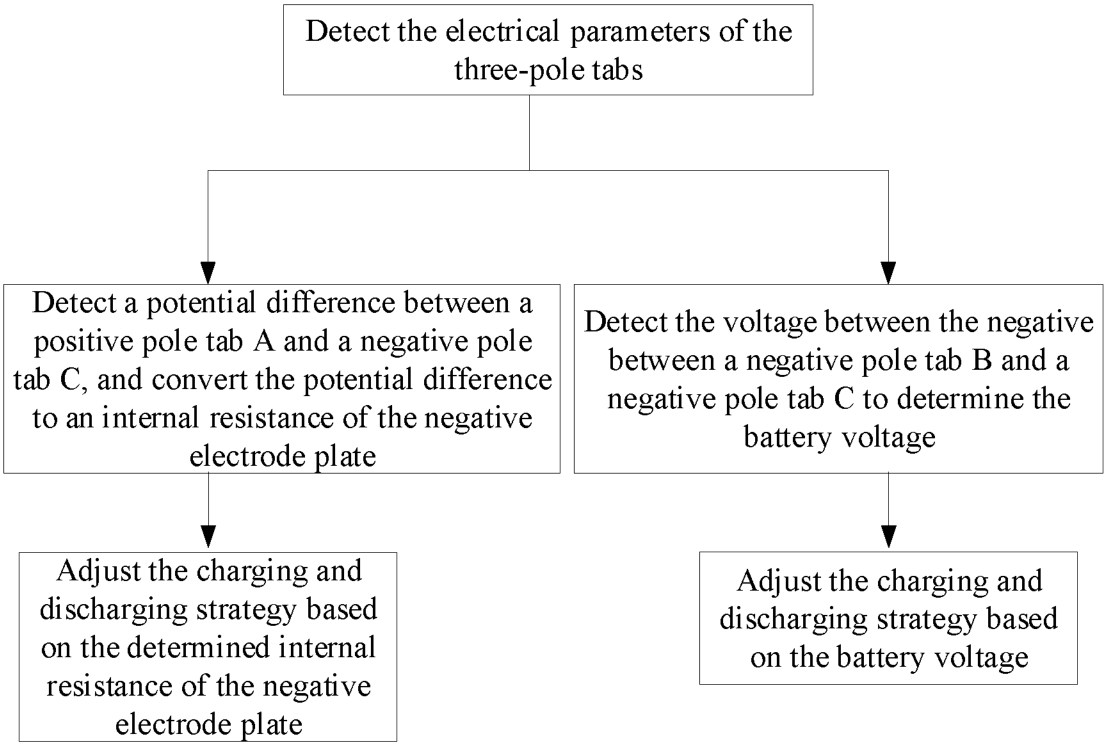
FIG. 7 illustrates a schematic diagram showing a functional architecture of a battery control method according to some embodiments of the present disclosure.

FIG. 7 illustrates a schematic diagram showing a functional architecture of a battery control method according to some embodiments of the present disclosure. Refer to FIG. 7, by detecting the electrical parameters of the pole tabs of the three-pole tab battery including one positive pole tab and two negative pole tabs, on one hand, the internal resistance value of the negative electrode plate can be determined, and the charging and discharging strategy can be then adjusted based on the health status of the negative electrode plate. Thus, for short-term effects, the crystallization and capacity decrease of the battery can be avoided. For long-term effects, as a number of charging and discharging cycles increases, the battery charging and discharging strategy can be corrected in real-time, which can increase the service life of the battery. On another hand, by detecting the electrical parameters of the pole tabs, the real battery voltage can be determined, and the battery charging and discharging strategy can be adjusted based on the real battery voltage. Accurate voltage compensation can be performed to eliminate the effect of the current polarization to feed back the real battery voltage. Thus, the battery charging time can be shortened, and the user experience can be improved. FIG. 7 summarizes the above technical content. A more complete implementation of the solution of the present disclosure can be understood in connection with FIG. 7.

To simply describe the method embodiments above, the method is described as a series of action combinations. Those skilled in the art should know that the present disclosure is not limited by an order of described actions. According to the present disclosure, some steps can be performed in another order or simultaneously. Further, those skilled in the art should know that the embodiments described in the specification are some embodiments of the present disclosure, and the related actions or modules may not be necessarily required by the present disclosure.

The method is described in detail in embodiments of the present disclosure. The method of the present disclosure can be implemented by various types of devices. The present disclosure provides a device, which is described in detail below.

Figure 8:
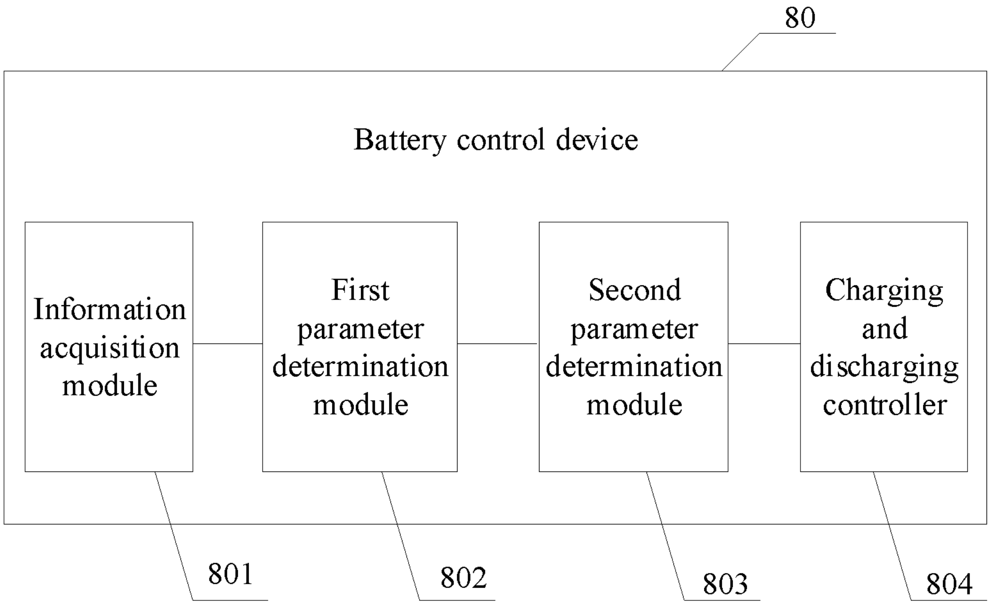
FIG. 8 illustrates a schematic structural diagram of a battery control device according to some embodiments of the present disclosure.

FIG. 8 illustrates a schematic structural diagram of a battery control device 80 according to some embodiments of the present disclosure. Referring to FIG. 8, the battery control device 80 includes an information acquisition module 801, a first parameter determination module 802, a second parameter determination module 803, and a charging and discharging controller 804.

The information acquisition module 801 can be configured to obtain the measurement information of the first negative pole tab and the second negative pole tab.

The first parameter determination module 802 can be configured to determine the first parameter of the negative electrode plate based on the measurement information.

The second parameter determination module 803 can be configured to determine the charging parameter and/or the discharging parameter of the first battery based on the first parameter.

The charging and discharging controller 804 can be configured to control the charging or discharging of the first battery based on the charging parameter and/or the discharging parameter.

In the battery control device of the present disclosure, the electrical parameters of the cathode of the battery can be detected through the two negative pole tabs arranged at the negative electrode plate of the battery. The performance status of the cathode of the battery can be objectively known. Then, the battery charging and discharging strategy can be timely adjusted according to the current status of the cathode of the battery. Thus, the application safety of the battery can be ensured in an extreme environment, and the service life of the battery can be increased as much as possible.

In some embodiments, the first parameter determination module can include a voltage difference determination module, a current determination module, and a resistance value determination module. The voltage difference determination module can be configured to determine the voltage difference between the first negative pole tab and the second negative pole tab. The current determination module can be configured to determine the current value of the first negative pole tab. The resistance value determination module can be configured to determine the resistance value of the negative electrode plate based on the voltage difference and the current value.

In some embodiments, the charging and discharging controller can be configured to, when the resistance value of the negative electrode plate is in the first interval, control the charging voltage of the first battery to be the first charging voltage and the discharging voltage of the first battery to be the first discharging voltage, and when the resistance value of the negative electrode plate is in the second interval, control the charging voltage of the first battery to be the second charging voltage and the discharging voltage of the first battery to be the second discharging voltage. The value in the first interval can be smaller than the value in the second interval. The first charging voltage can be larger than the second charging voltage. The first discharging voltage can be smaller than the second discharging voltage.

In some embodiments, the charging and discharging controller can be configured to, when the resistance value of the negative electrode plate is larger than the first value, control the first battery to stop charging and/or discharging.

In some embodiments, the charging and discharging controller can be further configured to determine the battery voltage value of the first battery based on the measurement information of the positive pole tab and the second negative pole tab of the first battery and controlling the first battery to charge based on the battery voltage value.

In some embodiments, the battery control device can further include a UI controller. The UI controller can be configured to adjust the power output data based on the determined charging parameter or the determined discharging parameter. The power output data can be used to display the output in the user interface.

In some embodiments, the battery controller can be configured to adjust the power output data based on the product of the determined charging parameter or the determined discharging parameter and the corresponding correction coefficient. Thus, the power output data can be 100% when the first battery is fully charged, and the power output data can be 0% when the first battery is fully discharged.

The battery control device of embodiments of the present disclosure can include one or more processors and one or more memories. The information acquisition module, the first parameter determination module, the second parameter determination module, the charging and discharging controller, the voltage difference determination module, the current determination module, the resistance value determination module, and the UI controller of embodiments of the present disclosure can be stored in the one or more memories as program modules. The one or more processors can be configured to execute the above program modules stored in the one or more memories to realize the corresponding functions.

The one or more processors can include one or more cores. The one or more cores can be configured to call the corresponding program modules from the one or more memories. The return visit data can be processed by adjusting the core parameters.

The one or more memories can include a volatile memory in a computer-readable medium, a random access memory (RAM), and/or a nonvolatile memory, such as a read-only memory (ROM) or a flash memory (flash RAM). The one or more memories can include one or more memory chips.

In some embodiments, a computer-readable storage medium can be provided and can be directly loaded into an internal memory of the computer. The computer program can be loaded into the computer and executed to implement the steps of the battery control method of embodiments of the present disclosure.

In some embodiments, a computer program product can also be provided and can be directly loaded into the internal memory of the computer. The internal memory can include the software codes. The computer program can be loaded into the computer and executed to implement the steps of the battery control method of embodiments of the present disclosure.

Further, embodiments of the present disclosure provide a battery. The battery can include a fuel gauge and a controller. The negative electrode plate of the battery can include a first negative pole tab and a second negative pole tab.

The fuel gauge can be configured to obtain the measurement information of the first negative pole tab and the second negative pole tab.

The controller can be configured to determine the first parameter of the negative electrode plate based on the measurement information.

The charging parameter and/or the discharging parameter of the first battery can be determined based on the first parameter.

The charging or discharging of the first battery can be controlled based on the charging parameter and/or the discharging parameter.

Embodiments of the present disclosure are described in a progressive manner. Each embodiment focuses on differences from other embodiments. Same and similar parts among the embodiments can be referred to each other. The device of embodiments of the present disclosure can correspond to the method of embodiments of the present disclosure. Thus, the device can be simply described, and the parts can be referred to the description of the method part.

In the specification, relational terms such as first and second can be solely used to distinguish one entity or action from another entity or action without necessarily requiring or implying any such actual relationship or order between such entities or actions. Moreover, the terms “comprising,”

"including," or any other variation thereof are intended to cover a non-exclusive inclusion. Thus, a process, method, article, or apparatus that includes a list of elements does not include only those elements but can include other elements not expressly listed or inherent to such process, method, article, or apparatus. Without further limitation, an element defined by the phrase "comprising a . . . " does not exclude the presence of other identical elements in the process, method, article, or apparatus that includes the element.

The steps of the method or algorithm described in connection with embodiments of the present disclosure can be embodied directly in hardware, a software module executed by a processor, or a combination thereof. The software module can be arranged in a random access memory (RAM), a memory, a read-only memory (ROM), an electrically programmable ROM, an electrically erasable programmable ROM, a register, a hard drive, a removable disk, a CD-ROM, or any other form of storage medium known in the art.

The above description of embodiments of the present disclosure is provided to enable those skilled in the art to implement or use the present disclosure. Various modifications to the embodiments are apparent to those skilled in the art. The generic principles defined in the specification can be implemented in other embodiments without departing from the spirit or scope of the present disclosure. Thus, the present disclosure is not intended to be limited to the embodiments above but confirms to the widest scope consistent with the principles and novel features of the present disclosure.

What is claimed is:

1. A battery control method applied to a first battery, comprising:

obtaining measurement information of a first negative pole tab and a second negative pole tab;

determining a first parameter of a negative electrode plate based on the measurement information;

determining a charging parameter and/or a discharging parameter of the first battery based on the first parameter; and controlling charging or discharging of the first battery based on the charging parameter and/or the discharging parameter, wherein determining the first parameter of the negative electrode plate based on the measurement information includes:

determining a voltage difference between the first negative pole tab and the second negative pole tab;

determining a current value of the first negative pole tab; and determining a resistance value of the negative electrode plate based on the voltage difference and the current value.

2. The method according to claim 1, wherein determining the charging parameter and/or the discharging parameter of the first battery based on the first parameter includes:

in response to the resistance value of the negative electrode plate being in a first interval, controlling a charging voltage of the first battery to be a first charging voltage and a discharging voltage of the first battery to be a first discharging voltage; and in response to the resistance value of the negative electrode plate being in a second interval, controlling the charging voltage of the first battery to be a second charging voltage and the discharging voltage of the first battery to be a second discharging voltage;

wherein:

a value in the first interval is smaller than a value in the second interval;

the first charging voltage is larger than the second charging voltage; and the first discharging voltage is smaller than the second discharging voltage.

3. The method according to claim 2, wherein determining the charging parameter and/or the discharging parameter of the first battery based on the first parameter includes:

in response to the resistance value of the negative electrode plate being larger than a first value, controlling the first battery to stop charging and/or discharging.

4. The method according to claim 1, further comprising:

determining a battery voltage value of the first battery based on the measurement information of the positive pole tab and the second negative pole tab of the first battery; and controlling the first battery to be charged based on the battery voltage value.

5. The method according to claim 1, further comprising, after determining the charging parameter and/or the discharging parameter of the first battery based on the first parameter:

adjusting power output data based on the determined charging parameter or the discharging parameter, the power output data being used to display on a user interface.

6. The method of claim 5, wherein adjusting the power output data based on the determined charging parameter or the discharging parameter includes:

adjusting the power output data based on a product of the determined charging parameter or the determined discharging parameter and a corresponding correction coefficient to cause the power output data to be 100% when the first battery is fully charged and 0% when the first battery is fully discharged.

7. A battery control device applied to a first battery, comprising:

one or more processors; and one or more memories storing a computer program that, when executed by the one or more processors, causes the one or more processors to:

obtain measurement information of a first negative pole tab and a second negative pole tab;

determine a first parameter of a negative electrode plate based on the measurement information;

determine a charging parameter and/or a discharging parameter of the first battery based on the first parameter; and control charging or discharging of the first battery based on the charging parameter and/or the discharging parameter, wherein the one or more processors are further configured to:

determine a voltage difference between the first negative pole tab and the second negative pole tab;

determine a current value of the first negative pole tab; and determine a resistance value of the negative electrode plate based on the voltage difference and the current value.

8. The device according to claim 7, wherein the one or more processors are further configured to:

in response to the resistance value of the negative electrode plate being in a first interval, control a charging voltage of the first battery to be a first charging voltage and a discharging voltage of the first battery to be a first discharging voltage; and in response to the resistance value of the negative electrode plate being in a second interval, control the charging voltage of the first battery to be a second charging voltage and the discharging voltage of the first battery to be a second discharging voltage;

wherein:

a value in the first interval is smaller than a value in the second interval;

the first charging voltage is larger than the second charging voltage; and the first discharging voltage is smaller than the second discharging voltage.

9. The device according to claim 8, wherein the one or more processors are further configured to:

in response to the resistance value of the negative electrode plate being larger than a first value, control the first battery to stop charging and/or discharging.

10. The device according to claim 7, wherein the one or more processors are further configured to:

determine a battery voltage value of the first battery based on the measurement information of the positive pole tab and the second negative pole tab of the first battery; and control the first battery to charge based on the battery voltage value.

11. The device according to claim 7, wherein the one or more processors are further configured to:

adjust power output data based on the determined charging parameter or the discharging parameter, the power output data being used to display on a user interface.

12. The device of claim 11, wherein the one or more processors are further configured to:

adjust the power output data based on a product of the determined charging parameter or the determined discharging parameter and a corresponding correction coefficient to cause the power output data to be 100% when the first battery is fully charged and 0% when the first battery is fully discharged.

13. A battery comprising:

a negative electrode plate including a first negative pole tab and a second negative pole tab;

a fuel gauge configured to obtain measurement information of a first negative pole tab and a second negative pole tab;

a controller configured to:

determine a first parameter of a negative electrode plate based on the measurement information;

determine a charging parameter and/or a discharging parameter of the first battery based on the first parameter; and control charging or discharging of the first battery based on the charging parameter and/or the discharging parameter, wherein the controller is further configured to:

determine a voltage difference between the first negative pole tab and the second negative pole tab;

determine a current value of the first negative pole tab; and determine a resistance value of the negative electrode plate based on the voltage difference and the current value.

14. The battery according to claim 13, wherein the controller is further configured to:

in response to the resistance value of the negative electrode plate being in a first interval, control a charging voltage of the first battery to be a first charging voltage and a discharging voltage of the first battery to be a first discharging voltage; and in response to the resistance value of the negative electrode plate being in a second interval, control the charging voltage of the first battery to be a second charging voltage and the discharging voltage of the first battery to be a second discharging voltage;

wherein:

a value in the first interval is smaller than a value in the second interval;

the first charging voltage is larger than the second charging voltage; and the first discharging voltage is smaller than the second discharging voltage.

15. The battery according to claim 14, wherein the controller is further configured to:

in response to the resistance value of the negative electrode plate being larger than a first value, control the first battery to stop charging and/or discharging.

16. The battery according to claim 13, wherein the controller is further configured to:

determine a battery voltage value of the first battery based on the measurement information of the positive pole tab and the second negative pole tab of the first battery; and control the first battery to be charged based on the battery voltage value.

17. The battery according to claim 13, wherein the controller is further configured to:

adjust power output data based on the determined charging parameter or the discharging parameter, the power output data being used to display on a user interface.

* * * * *